United States Patent
Buckley et al.

(10) Patent No.: US 10,521,200 B2
(45) Date of Patent: Dec. 31, 2019

(54) UNAMBIGUOUS PROXYING OF INTERFACE METHODS

(71) Applicant: Oracle International Corporation, Redwood Shores, CA (US)

(72) Inventors: Alexander R. Buckley, Cupertino, CA (US); Lai Hung Mandy Chung, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/808,784

(22) Filed: Nov. 9, 2017

(65) Prior Publication Data

US 2018/0196645 A1 Jul. 12, 2018

Related U.S. Application Data

(60) Provisional application No. 62/444,274, filed on Jan. 9, 2017.

(51) Int. Cl.
*G06F 9/455* (2018.01)
*G06F 9/54* (2006.01)
(Continued)

(52) U.S. Cl.
CPC .................. *G06F 8/35* (2013.01); *G06F 8/24* (2013.01); *G06F 8/37* (2013.01); *G06F 9/3836* (2013.01);
(Continued)

(58) Field of Classification Search
None
See application file for complete search history.

(56) References Cited

U.S. PATENT DOCUMENTS 5,903,725 A * 5/1999 Colyer .................... G06F 9/548
 709/203
6,157,960 A * 12/2000 Kaminsky ............... G06F 9/548
 719/315
(Continued)

FOREIGN PATENT DOCUMENTS

CA  2875046 A1 * 6/2016 ......... G06F 9/44521

OTHER PUBLICATIONS

Wehr, Stefan, Ralf Lämmel, and Peter Thiemann. "JavaGI: generalized interfaces for java." European Conference on Object-Oriented Programming. Springer, Berlin, Heidelberg, 2007. (Year: 2007).*

(Continued)

*Primary Examiner* — Matthew J Brophy
(74) *Attorney, Agent, or Firm* — Invoke

(57) ABSTRACT

A runtime environment identifies a request for a proxy object whose class implements a plurality of interfaces. Responsive to the request, the runtime object generates a class for the proxy object. Generating the class comprises determining that two or more interfaces, of the plurality of interfaces, define a respective method body with a same method signature. Responsive to determining that the two or more interfaces define a respective method body with a same method signature, the runtime environment may (a) omit a method body, in the class, for a particular method corresponding to the method signature, (b) include a method body that triggers a runtime error, or (c) include a method body that includes operations to select a default method declared in one of the two or more interfaces.

24 Claims, 6 Drawing Sheets

(51) Int. Cl.
*G06F 8/35* (2018.01)
*G06F 8/30* (2018.01)
*G06F 9/38* (2018.01)
*G06F 8/20* (2018.01)

(52) U.S. Cl.
CPC .............. *G06F 9/54* (2013.01); *G06F 9/548* (2013.01); *G06F 2009/4557* (2013.01)

(56) References Cited

U.S. PATENT DOCUMENTS

| | | | | |
|---|---|---|---|---|
| 6,324,543 | B1* | 11/2001 | Cohen | G06F 9/465 |
| 6,651,248 | B1* | 11/2003 | Alpern | G06F 9/449 |
| | | | | 717/162 |
| 6,901,588 | B1* | 5/2005 | Krapf | G06F 9/4488 |
| | | | | 717/164 |
| 6,918,122 | B2* | 7/2005 | Matula | G06F 8/447 |
| | | | | 719/316 |
| 6,988,273 | B2* | 1/2006 | Matula | G06F 8/447 |
| | | | | 719/316 |
| 7,533,388 | B1* | 5/2009 | Cavanaugh | G06F 9/548 |
| | | | | 709/203 |
| 7,873,958 | B2* | 1/2011 | Wiltamuth | G06F 8/71 |
| | | | | 717/170 |
| 8,032,588 | B2* | 10/2011 | Fang | G06F 9/54 |
| | | | | 707/695 |
| 10,083,014 | B2* | 9/2018 | Buckley | G06F 8/315 |
| 2002/0120793 | A1* | 8/2002 | Guthrie | G06F 9/548 |
| | | | | 719/330 |
| 2003/0056023 | A1* | 3/2003 | Cole | G06F 9/548 |
| | | | | 719/315 |
| 2004/0083483 | A1* | 4/2004 | Yamamoto | G06F 9/541 |
| | | | | 719/316 |
| 2005/0149914 | A1* | 7/2005 | Krapf | G06F 9/4488 |
| | | | | 717/136 |
| 2005/0240945 | A1* | 10/2005 | Glass | G06F 9/548 |
| | | | | 719/330 |
| 2006/0123390 | A1* | 6/2006 | Chan | G06F 9/45512 |
| | | | | 717/115 |
| 2008/0082959 | A1* | 4/2008 | Fowler | G06F 8/24 |
| | | | | 717/104 |
| 2008/0178151 | A1* | 7/2008 | Chan | G06F 9/45512 |
| | | | | 717/115 |
| 2009/0319651 | A1* | 12/2009 | Fang | G06F 9/54 |
| | | | | 709/223 |
| 2010/0100894 | A1* | 4/2010 | Meduri | G06F 9/52 |
| | | | | 719/330 |
| 2017/0068520 | A1* | 3/2017 | Buckley | G06F 11/3664 |
| 2018/0018163 | A1* | 1/2018 | Goetz | G06F 8/447 |
| 2018/0364989 | A1* | 12/2018 | Buckley | G06F 11/3664 |

OTHER PUBLICATIONS

Goetz, Brian. "Interface evolution via "public defender" methods." Third draft, Aug. 2010. Available at <https://static.dzone.com/dz1/dz-files/DefenderMethods_0.pdf> (Year: 2010).*

Van Heiningen, Willem, Tim Brecht, and Steve MacDonald. "Exploiting dynamic proxies in middleware for distributed, parallel, and mobile Java applications." Proceedings 20th IEEE (Year: 2006).*

Goetz, Brian. "Interface evolution via virtual extensions methods." Oracle Corporation, Tech. Rep. (2011). Availabe at <http://wiki.jvmlangsummit.com/images/7/71/2011_Goetz_Extension.pdf> (Year: 2011).*

* cited by examiner

UNAMBIGUOUS PROXYING OF INTERFACE METHODS

This application claims the benefit of U.S. Provisional Patent Appl. No. 62/444,274, filed Jan. 9, 2017, the entire contents of which are incorporated by reference as if set forth in their entirety.

This application is related to U.S. patent application Ser. No. 14/878,699, filed Oct. 8, 2015, which claims benefit to provisional application No. 62/215,535 filed on Sep. 8, 2015, the contents for both of which are hereby incorporated by reference.

TECHNICAL FIELD

The present disclosure relates to generating classes for proxy objects. In particular, the present disclosure relates to resolving conflicts between method declarations in different interfaces that are implemented by a class for a proxy object.

BACKGROUND

Some programming languages provide the ability to declare methods that contain code in types other than classes. For example, Java provides the ability to declare default and abstract methods within a reference type known as an interface. A default method within an interface consists of a method signature and a method body. In contrast, an abstract method within an interface consists of a method signature but no method body.

Classes implementing an interface are able to inherit default methods without declaring a method with a matching method signature or providing a method body. For example, if a method with signature void m( ) is declared as a default method in an interface, then classes implementing the interface may inherit the default method void m( ) without including additional code. If the function void m( ) was instead declared as an abstract method, then no method body would be included in the interface. As a result, any class implementing the collection interface would be responsible for providing the code for the method void m( ) by declaring a method that overrides the abstract method in the interface. Abstract methods may thus incur a significant cost on developers writing classes implementing a particular interface. Default methods mitigate these costs by allowing the same method body, declared within an interface, to be shared across multiple classes implementing the interface. Any changes to the interface's default methods are propagated to the classes implementing the interface without the need to modify the classes.

Conflicts may arise when a class implements different interfaces that declare default methods having the same method signature. For example, two or more interfaces may include a default method with the same signature void m( ) and different method bodies. If a class implements both interfaces, then method invocation of m( ) of the class may create ambiguity as to which of the default methods was intended to be executed.

Proxying may lead to further ambiguity when default methods conflict. Proxying allows method calls on an object that implements an interface to be intercepted. The intercepted method calls are dispatched to an object, referred to as a method call processor. The method call processor determines how to handle an intercepted method call. For example, the method call processor may record or modify the method call. Additionally or alternatively, the method call processor may dispatch the method call to another underlying object that implements the interfaces. If a method invocation to a conflicting default method is intercepted, then the method call processor may not behave as intended.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
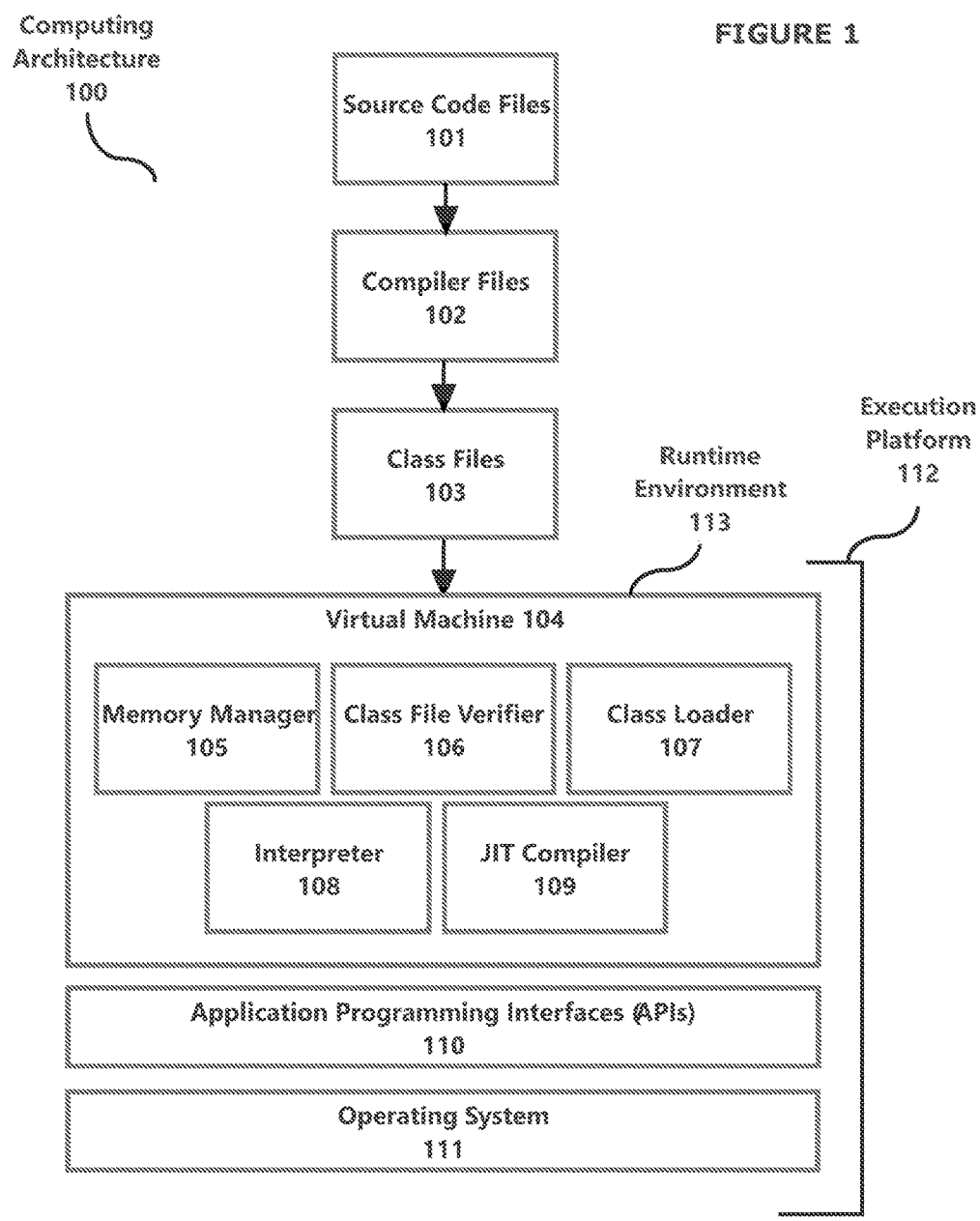
FIG. 1 illustrates an example computing architecture in which techniques described herein may be practiced.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
   2.1 EXAMPLE CLASS FILE STRUCTURE
   2.2 EXAMPLE VIRTUAL MACHINE ARCHITECTURE
   2.3 LOADING, LINKING, AND INITIALIZING
3. GENERATING DYNAMIC PROXY CLASSES
4. CONFLICT RESOLUTION FOR PROXYING INTERFACE METHODS
   4.1 NON-GENERATION OF PROXY CLASSES
   4.2 PROXY CLASSES THAT TRIGGER ERRORS
      4.2.1 OMITTING METHOD DECLARATIONS
      4.2.2 INCLUDING ABSTRACT METHOD DECLARATIONS
      4.2.3 DEFINING ERRORS IN CONCRETE METHOD DECLARATIONS
      4.2.4 ERROR HANDLING BY METHOD CALL PROCESSOR
   4.3 DEFAULT METHOD SELECTION
      4.3.1 ADDING CONCRETE METHODS
      4.3.2 GENERATING SYNTHETIC INTERFACES 4.3.3 PROMPTING USERS TO SELECT DEFAULT METHODS
4.3.4 PASSING CONTROL TO A METHOD CALL PROCESSOR
4.4 EXAMPLE OPERATIONS FOR ADDRESSING CONFLICTING DEFAULT METHODS
5. HARDWARE OVERVIEW
6. MISCELLANEOUS; EXTENSIONS

1. General Overview

One or more embodiments include generating a class which implements a plurality of interfaces with conflicting methods, i.e., methods with the same method signature. A runtime environment detects a request, for a proxy object, that identifies a plurality of interfaces. The runtime environment generates a new class, for the proxy object, that implements the plurality of interfaces. When generating the new class, the runtime environment determines that each of two or more interfaces define a respective method body with the same method signature. Since two or more interfaces, to be implemented by the new class, define a method body with the same method signature, the methods conflict with each other. Responsive to detecting conflicting methods, the runtime environment may (a) omit a method body in the new class with the method signature of the conflicting methods or (b) select a method body of one of the conflicting methods to include in the new class.

In one or more embodiments, the runtime environment triggers a runtime error or exception (collectively referred to herein as runtime errors) when the interfaces, to be implemented by the new class, include conflicting default methods. A runtime error may be triggered in several different ways. For example, the runtime environment may fail to generate a requested proxy object or generate a proxy object that triggers an immediate runtime error. In another example, the runtime environment may return a valid proxy object, but omit a method signature and/or body from the class generated for the proxy object. In this case, a runtime error is generated at the time the method is invoked, which may be much later than the time when the proxy object is generated. In another example, a method call processor, such as an invocation handler, may include code for triggering a runtime error or exception. In this case, the class includes a method body that dispatches the method call to the method call processor. Code within the method call processor may then trigger an error to notify a user about the conflicting default methods.

In one or more embodiments, the runtime environment selects a method body of a default method that is declared in one of a plurality of interfaces, to include in the new class that implements the plurality of interfaces. For example, the runtime environment may select the default method based on (a) the frequency with which each default method with the same signature is invoked, (b) metadata included in the request for the proxy object, (c) naming conventions, and/or (d) other selection criteria. In other cases, the runtime environment may query a user to select one of the default methods. This approach allows for the runtime environment to disambiguate between conflicting default methods without throwing a runtime error.

One or more embodiments described in this Specification and/or recited in the claims may not be included in this General Overview section.

2. Architectural Overview

FIG. 1 illustrates an example architecture in which techniques described herein may be practiced. Software and/or hardware components described with relation to the example architecture may be omitted or associated with a different set of functionality than described herein. Software and/or hardware components, not described herein, may be used within an environment in accordance with one or more embodiments. Accordingly, the example environment should not be constructed as limiting the scope of any of the claims.

As illustrated in FIG. 1, a computing architecture 100 includes source code files 101 which are compiled by a compiler 102 into blueprints representing the program to be executed. Examples of the blueprints include class files 103. The class files 103 are then loaded and executed by an execution platform 112, which includes a runtime environment 113, an operating system 111, and one or more application programming interfaces (APIs) 110 that enable communication between the runtime environment 113 and the operating system 111. The runtime environment 112 includes a virtual machine 104 comprising various components, such as a memory manager 105 (which may include a garbage collector), a class file verifier 106 to check the validity of class files 103, a class loader 107 to locate and build in-memory representations of classes, an interpreter 108 for executing the virtual machine 104 code, and a just-in-time (JIT) compiler 109 for producing optimized machine-level code.

In an embodiment, the computing architecture 100 includes source code files 101 that contain code that has been written in a particular programming language, such as Java, C, C++, C#, Ruby, Perl, and so forth. Thus, the source code files 101 adhere to a particular set of syntactic and/or semantic rules for the associated language. For example, code written in Java adheres to the Java Language Specification. However, since specifications are updated and revised over time, the source code files 101 may be associated with a version number indicating the revision of the specification to which the source code files 101 adhere. The exact programming language used to write the source code files 101 is generally not critical.

In various embodiments, the compiler 102 converts the source code, which is written according to a specification directed to the convenience of the programmer, to either machine or object code, which is executable directly by the particular machine environment, or an intermediate representation ("virtual machine code/instructions"), such as bytecode, which is executable by a virtual machine 104 that is capable of running on top of a variety of particular machine environments. The virtual machine instructions are executable by the virtual machine 104 in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine 104 resides.

In general, programs are executed either as a compiled or an interpreted program. When a program is compiled, the code is transformed globally from a first language to a second language before execution. Since the work of transforming the code is performed ahead of time; compiled code tends to have excellent run-time performance. In addition, since the transformation occurs globally before execution, the code can be analyzed and optimized using techniques such as constant folding, dead code elimination, inlining, and so forth. However, depending on the program being executed, the startup time can be significant. In addition, inserting new code would require the program to be taken offline, re-compiled, and re-executed. For many dynamic languages (such as Java) which are designed to allow code to be inserted during the program's execution, a purely compiled approach may be inappropriate. When a program is interpreted, the code of the program is read line-by-line and converted to machine-level instructions while the program is executing. As a result, the program has a short startup time (can begin executing almost immediately), but the run-time performance is diminished by performing the transformation on the fly. Furthermore, since each instruction is analyzed individually, many optimizations that rely on a more global analysis of the program cannot be performed.

In some embodiments, the virtual machine 104 includes an interpreter 108 and a JIT compiler 109 (or a component implementing aspects of both), and executes programs using a combination of interpreted and compiled techniques. For example, the virtual machine 104 may initially begin by interpreting the virtual machine instructions representing the program via the interpreter 108 while tracking statistics related to program behavior, such as how often different sections or blocks of code are executed by the virtual machine 104. Once a block of code surpass a threshold (is "hot"), the virtual machine 104 invokes the JIT compiler 109 to perform an analysis of the block and generate optimized machine-level instructions which replaces the "hot" block of code for future executions. Since programs tend to spend most time executing a small portion of overall code, compiling just the "hot" portions of the program can provide similar performance to fully compiled code, but without the start-up penalty. Furthermore, although the optimization analysis is constrained to the "hot" block being replaced, there still exists far greater optimization potential than converting each instruction individually. There are a number of variations on the above described example, such as tiered compiling.

In order to provide clear examples, the source code files 101 have been illustrated as the "top level" representation of the program to be executed by the execution platform 111. Although the computing architecture 100 depicts the source code files 101 as a "top level" program representation, in other embodiments the source code files 101 may be an intermediate representation received via a "higher level" compiler that processed code files in a different language into the language of the source code files 101. Some examples in the following disclosure assume that the source code files 101 adhere to a class-based object-oriented programming language. However, this is not a requirement to utilizing the features described herein.

In an embodiment, compiler 102 receives as input the source code files 101 and converts the source code files 101 into class files 103 that are in a format expected by the virtual machine 104. For example, in the context of the JVM, the Java Virtual Machine Specification defines a particular class file format to which the class files 103 are expected to adhere. In some embodiments, the class files 103 contain the virtual machine instructions that have been converted from the source code files 101. However, in other embodiments, the class files 103 may contain other structures as well, such as tables identifying constant values and/or metadata related to various structures (classes, fields, methods, and so forth).

The following discussion assumes that each of the class files 103 represents a respective "class" defined in the source code files 101 (or dynamically generated by the compiler 102/virtual machine 104). However, the aforementioned assumption is not a strict requirement and will depend on the implementation of the virtual machine 104. Thus, the techniques described herein may still be performed regardless of the exact format of the class files 103. In some embodiments, the class files 103 are divided into one or more "libraries" or "packages", each of which includes a collection of classes that provide related functionality. For example, a library may contain one or more class files that implement input/output (1/0) operations, mathematics tools, cryptographic techniques, graphics utilities, and so forth. Further, some classes (or fields/methods within those classes) may include access restrictions that limit their use to within a particular class/library/package or to classes with appropriate permissions.

2.1 Example Class File Structure

Figure 2:
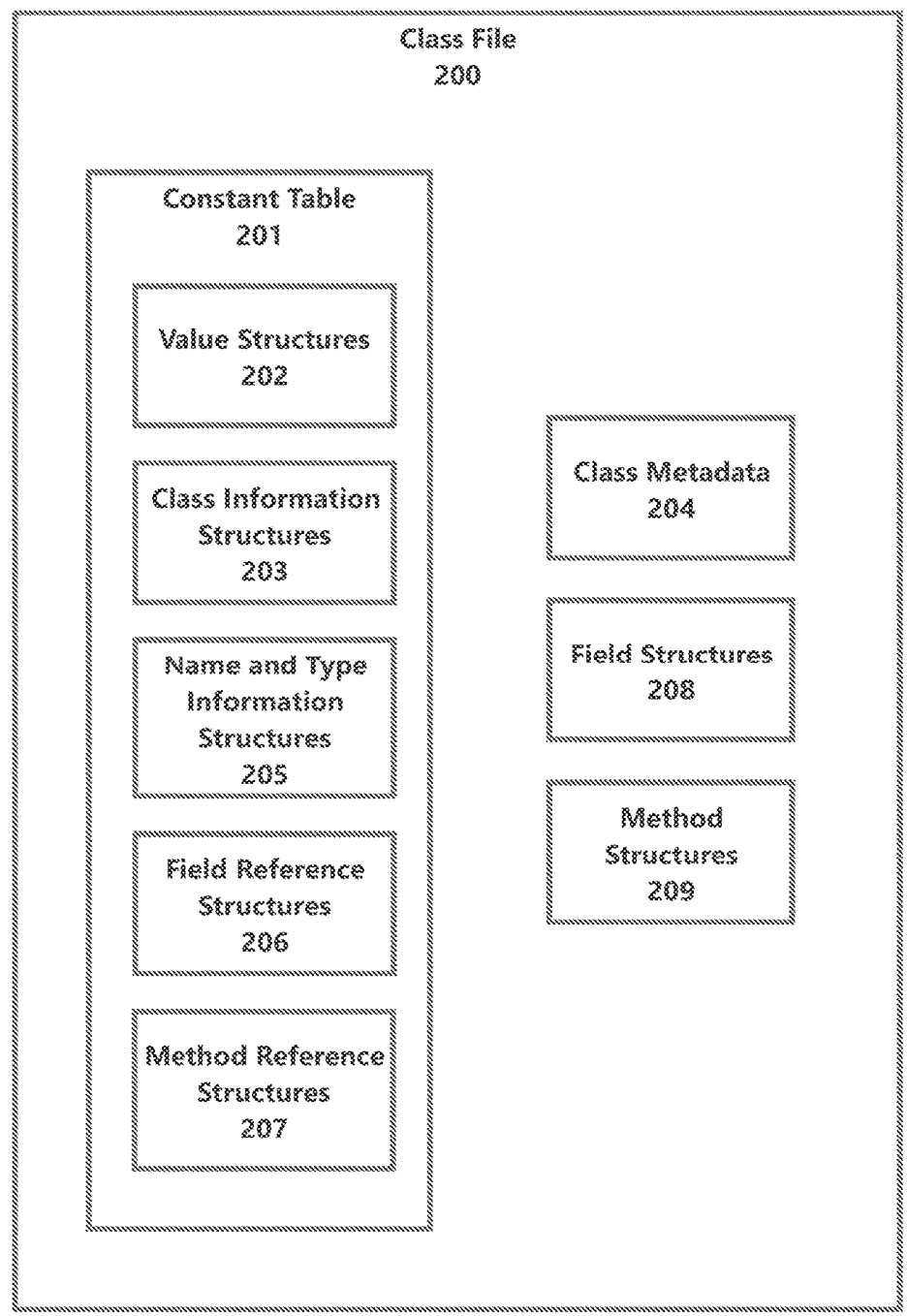
FIG. 2 is a block diagram illustrating one embodiment of a computer system suitable for implementing methods and features described herein.

FIG. 2 illustrates an example structure for a class file 200 in block diagram form according to an embodiment. In order to provide clear examples, the remainder of the disclosure assumes that the class files 103 of the computing architecture 100 adhere to the structure of the example class file 200 described in this section. However, in a practical environment, the structure of the class file 200 will be dependent on the implementation of the virtual machine 104. Further, one or more features discussed herein may modify the structure of the class file 200 to, for example, add additional structure types. Therefore, the exact structure of the class file 200 is not critical to the techniques described herein. For the purposes of Section 2.1, "the class" or "the present class" refers to the class represented by the class file 200.

In FIG. 2, the class file 200 is made up of class members including, but not limited to, a constant table 201, field structures 208, class metadata 204, and method structures 209. In an embodiment, the constant table 201 is a data structure which, among other functions, acts as a symbol table for the class. For example, the constant table 201 may store data related to the various identifiers used in the source code files 101 such as type, scope, contents, and/or location. The constant table 201 has entries for value structures 202 (representing constant values of type int, long, double, float, byte, string, and so forth), class information structures 203, name and type information structures 205, field reference structures 206, and method reference structures 207 derived from the source code files 101 by the compiler 102. In an embodiment, the constant table 201 is implemented as an array that maps an index i to structure j. However, the exact implementation of the constant table 201 is not critical.

In some embodiments, the entries of the constant table 201 include structures which index other constant table 201 entries. For example, an entry for one of the value structures 202 representing a string may hold a tag identifying its "type" as string and an index to one or more other value structures 202 of the constant table 201 storing char, byte or int values representing the ASCII characters of the string.

In an embodiment, field reference structures 206 of the constant table 201 hold an index into the constant table 201 to one of the class information structures 203 representing the class defining the field and an index into the constant table 201 to one of the name and type information structures 205 that provides the name and descriptor of the field. Method reference structures 207 of the constant table 201 hold an index into the constant table 201 to one of the class information structures 203 representing the class defining the method and an index into the constant table 201 to one of the name and type information structures 205 that provides the name and descriptor for the method. The class information structures 203 hold an index into the constant table 201 to one of the value structures 202 holding the name of the associated class.

The name and type information structures 205 hold an index into the constant table 201 to one of the value structures 202 storing the name of the field/method and an index into the constant table 201 to one of the value structures 202 storing the descriptor.

In an embodiment, class metadata 204 includes metadata for the class, such as version number(s), number of entries in the constant pool, number of fields, number of methods, access flags (whether the class is public, non-public, final, abstract, etc.), an index to one of the class information structures 203 of the constant table 201 that identifies the present class, an index to one of the class information structures 203 of the constant table 201 that identifies the superclass (if any), and so forth.

In an embodiment, the field structures 208 represent a set of structures that identifies the various fields of the class. The field structures 208 store, for each field of the class, accessor flags for the field (whether the field is static, public, non-public, final, etc.), an index into the constant table 201 to one of the value structures 202 that holds the name of the field, and an index into the constant table 201 to one of the value structures 202 that holds a descriptor of the field.

In an embodiment, the method structures 209 represent a set of structures that identifies the various methods of the class. The method structures 209 store, for each method of the class, accessor flags for the method (e.g. whether the method is static, public, non-public, synchronized, etc.), an index into the constant table 201 to one of the value structures 202 that holds the name of the method, an index into the constant table 201 to one of the value structures 202 that holds the descriptor of the method, and the virtual machine instructions that correspond to the body of the method as defined in the source code files 101.

In an embodiment, a descriptor represents a type of a field or method. For example, the descriptor may be implemented as a string adhering to a particular syntax. While the exact syntax is not critical, a few examples are described below.

In an example where the descriptor represents a type of the field, the descriptor identifies the type of data held by the field. In an embodiment, a field can hold a basic type, an object, or an array. When a field holds a basic type, the descriptor is a string that identifies the basic type (e.g., "B"=byte, "C"=char, "D"=double, "F"=float, "I"=int, "J"=long int, etc.). When a field holds an object, the descriptor is a string that identifies the class name of the object (e.g. "L ClassName"). "L" in this case indicates a reference, thus "L ClassName" represents a reference to an object of class ClassName. When the field is an array, the descriptor identifies the type held by the array. For example, "[B" indicates an array of bytes, with "[" indicating an array and "B" indicating that the array holds the basic type of byte. However, since arrays can be nested, the descriptor for an array may also indicate the nesting. For example, "[[L ClassName" indicates an array where each index holds an array that holds objects of class ClassName. In some embodiments, the ClassName is fully qualified and includes the simple name of the class, as well as the pathname of the class. For example, the ClassName may indicate where the file is stored in the package, library, or file system hosting the class file 200.

In the case of a method, the descriptor identifies the parameters of the method and the return type of the method. For example, a method descriptor may follow the general form "({ParameterDescriptor}) ReturnDescriptor", where the {ParameterDescriptor} is a list of field descriptors representing the parameters and the ReturnDescriptor is a field descriptor identifying the return type. For instance, the string "V" may be used to represent the void return type. Thus, a method defined in the source code files 101 as "Object m (int I, double d, Thread t) { . . . }" matches the descriptor "(I D L Thread) L Object".

In an embodiment, the virtual machine instructions held in the method structures 209 include operations which reference entries of the constant table 201. Using Java as an example, consider the following class:

```
class A {
    int add12and13( ) {
        return B.addIntegers(12, 13);
    }
}
```

In the above example, the Java method add12and13 is declared in class A to take no parameters. The body of method add12and13 calls static method addIntegers of class B which takes the constant integer values 12 and 13 as parameters, and returns the result. Thus, in the constant table 201, the compiler 102 includes, among other entries, a method reference structure that corresponds to the call to the method B.addIntegers. In Java, a call to a method compiles down to an invoke command in the bytecode of the JVM (in this case invokestatic as addIntegers is a static method of class B). The invoke command is provided an index into the constant table 201 corresponding to the method reference structure that identifies the class defining addIntegers "B", the name of addIntegers "addIntegers", and the descriptor of addIntegers "(I I)I". For example, assuming the aforementioned method reference is stored at index 4, the bytecode instruction may appear as "invokestatic #4".

Since the constant table 201 refers to classes, methods, and fields symbolically with structures carrying identifying information, rather than direct references to a memory location, the entries of the constant table 201 are referred to as "symbolic references". One reason that symbolic references are utilized for the class files 103 is because, in some embodiments, the compiler 102 is unaware of how and where the classes will be stored once loaded into the runtime environment 112. As will be described in Section 2.3, eventually the run-time representation of the symbolic references are resolved into actual memory addresses by the virtual machine 104 after the referenced classes (and associated structures) have been loaded into the runtime environment and allocated concrete memory locations.

2.2 Example Virtual Machine Architecture

Figure 3:
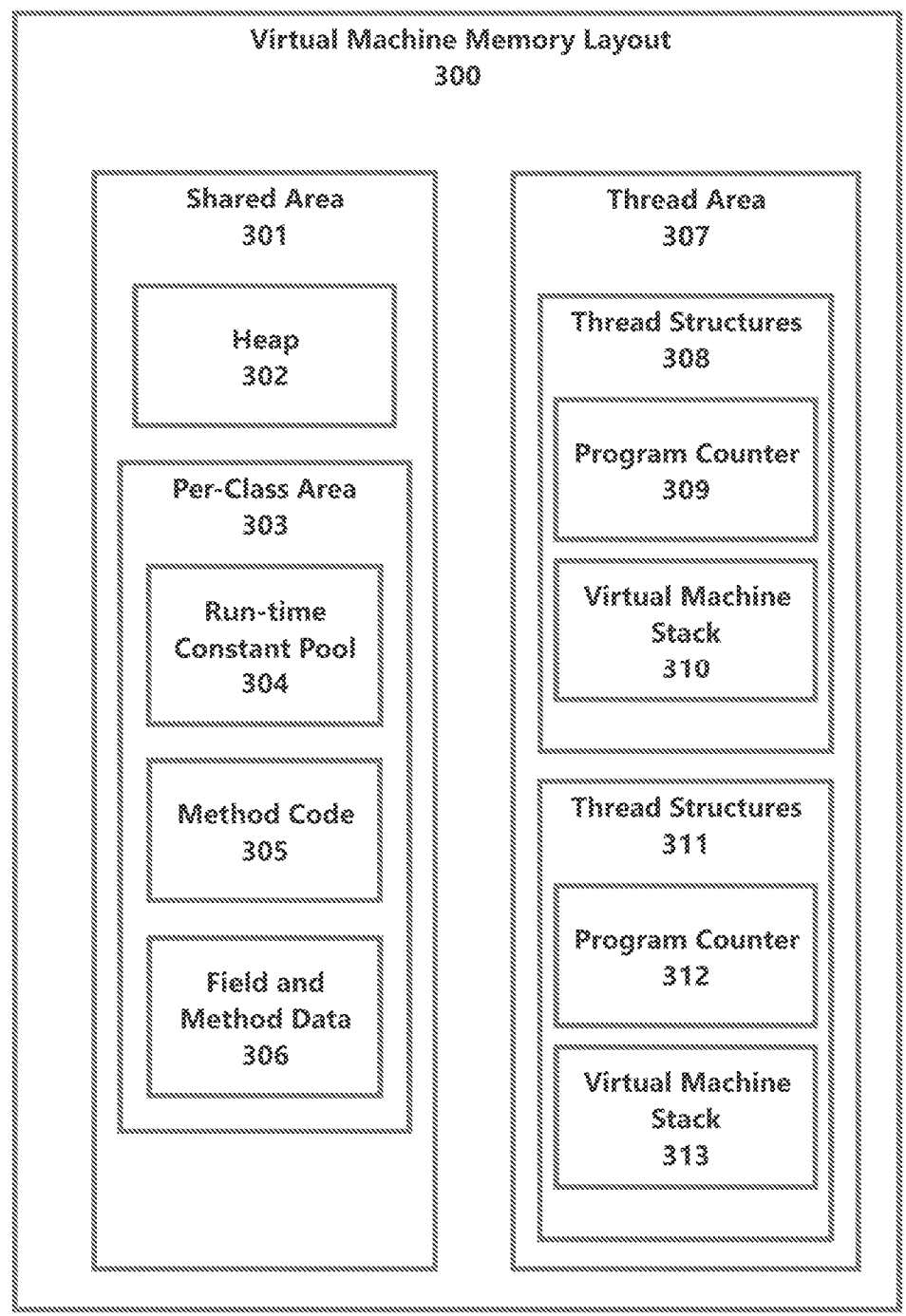
FIG. 3 illustrates an example virtual machine memory layout in block diagram form, in accordance with one or more embodiments.

FIG. 3 illustrates an example virtual machine memory layout 300 in block diagram form according to an embodiment. In order to provide clear examples, the remaining discussion will assume that the virtual machine 104 adheres to the virtual machine memory layout 300 depicted in FIG. 3. In addition, although components of the virtual machine memory layout 300 may be referred to as memory "areas", there is no requirement that the memory areas are contiguous.

In the example illustrated by FIG. 3, the virtual machine memory layout 300 is divided into a shared area 301 and a thread area 307. The shared area 301 represents an area in memory where structures shared among the various threads executing on the virtual machine 104 are stored. The shared area 301 includes a heap 302 and a per-class area 303. In an embodiment, the heap 302 represents the run-time data area from which memory for class instances and arrays is allocated. In an embodiment, the per-class area 303 represents the memory area where the data pertaining to the individual classes are stored. In an embodiment, the per-class area 303 includes, for each loaded class, a run-time constant pool 304 representing data from the constant table 201 of the class, field and method data 306 (for example, to hold the static fields of the class), and the method code 305 representing the virtual machine instructions for methods of the class.

The thread area 307 represents a memory area where structures specific to individual threads are stored. In FIG. 3, the thread area 307 includes thread structures 308 and thread structures 311, representing the per-thread structures utilized by different threads. In order to provide clear examples, the thread area 307 depicted in FIG. 3 assumes two threads are executing on the virtual machine 104. However, in a practical environment, the virtual machine 104 may execute any arbitrary number of threads, with the number of thread structures scaled accordingly.

In an embodiment, thread structures 308 includes program counter 309 and virtual machine stack 310. Similarly, thread structures 311 includes program counter 312 and virtual machine stack 313. In an embodiment, program counter 309 and program counter 312 store the current address of the virtual machine instruction being executed by their respective threads.

Thus, as a thread steps through the instructions, the program counters are updated to maintain an index to the current instruction. In an embodiment, virtual machine stack 310 and virtual machine stack 313 each store frames for their respective threads that hold local variables and partial results, and is also used for method invocation and return.

In an embodiment, a frame is a data structure used to store data and partial results, return values for methods, and perform dynamic linking. A new frame is created each time a method is invoked. A frame is destroyed when the method that caused the frame to be generated completes. Thus, when a thread performs a method invocation, the virtual machine 104 generates a new frame and pushes that frame onto the virtual machine stack associated with the thread.

When the method invocation completes, the virtual machine 104 passes back the result of the method invocation to the previous frame and pops the current frame off of the stack. In an embodiment, for a given thread, one frame is active at any point. This active frame is referred to as the current frame, the method that caused generation of the current frame is referred to as the current method, and the class to which the current method belongs is referred to as the current class.

2.3 Loading, Linking, and Initializing

In an embodiment, the virtual machine 104 dynamically loads, links, and initializes classes. Loading is the process of finding a class with a particular name and creating a representation from the associated class file 200 of that class within the memory of the runtime environment 112. For example, creating the run-time constant pool 304, method code 305, and field and method data 306 for the class within the per-class area 303 of the virtual machine memory layout 300. Linking is the process of taking the in-memory representation of the class and combining it with the run-time state of the virtual machine 104 so that the methods of the class can be executed. Initialization is the process of executing the class constructors to set the starting state of the field and method data 306 of the class and/or create class instances on the heap 302 for the initialized class.

The following are examples of loading, linking, and initializing techniques that may be implemented by the virtual machine 104. However, in many embodiments the steps may be interleaved, such that an initial class is loaded, then during linking a second class is loaded to resolve a symbolic reference found in the first class, which in turn causes a third class to be loaded, and so forth. Thus, progress through the stages of loading, linking, and initializing can differ from class to class. Further, some embodiments may delay (perform "lazily") one or more functions of the loading, linking, and initializing process until the class is actually required. For example, resolution of a method reference may be delayed until a virtual machine instruction invoking the method is executed. Thus, the exact timing of when the steps are performed for each class can vary greatly between implementations.

To begin the loading process, the virtual machine 104 starts up by invoking the class loader 107 which loads an initial class. The technique by which the initial class is specified will vary from embodiment to embodiment. For example, one technique may have the virtual machine 104 accept a command line argument on startup that specifies the initial class.

To load a class, the class loader 107 parses the class file 200 corresponding to the class and determines whether the class file 200 is well-formed (meets the syntactic expectations of the virtual machine 104). If not, the class loader 107 generates an error. For example, in Java the error might be generated in the form of an exception which is thrown to an exception handler for processing. Otherwise, the class loader 107 generates the in-memory representation of the class by allocating the run-time constant pool 304, method code 305, and field and method data 306 for the class within the per-class area 303.

In some embodiments, when the class loader 107 loads a class, the class loader 107 also recursively loads the super-classes of the loaded class. For example, the virtual machine 104 may ensure that the superclasses of a particular class are loaded, linked, and/or initialized before proceeding with the loading, linking and initializing process for the particular class.

During linking, the virtual machine 104 verifies the class, prepares the class, and performs resolution of the symbolic references defined in the run-time constant pool 304 of the class.

To verify the class, the virtual machine 104 checks whether the in-memory representation of the class is structurally correct. For example, the virtual machine 104 may check that each class except the generic class Object has a superclass, check that final classes have no sub-classes and final methods are not overridden, check whether constant pool entries are consistent with one another, check whether the current class has correct access permissions for classes/fields/structures referenced in the constant pool 304, check that the virtual machine 104 code of methods will not cause unexpected behavior (e.g. making sure a jump instruction does not send the virtual machine 104 beyond the end of the method), and so forth. The exact checks performed during verification are dependent on the implementation of the virtual machine 104. In some cases, verification may cause additional classes to be loaded, but does not necessarily require those classes to also be linked before proceeding. For example, assume Class A contains a reference to a static field of Class B. During verification, the virtual machine 104 may check Class B to ensure that the referenced static field actually exists, which might cause loading of Class B, but not necessarily the linking or initializing of Class B. However, in some embodiments, certain verification checks can be delayed until a later phase, such as being checked during resolution of the symbolic references. For example, some embodiments may delay checking the access permissions for symbolic references until those references are being resolved.

To prepare a class, the virtual machine 104 initializes static fields located within the field and method data 306 for the class to default values. In some cases, setting the static fields to default values may not be the same as running a constructor for the class. For example, the verification process may zero out or set the static fields to values that the constructor would expect those fields to have during initialization.

During resolution, the virtual machine 104 dynamically determines concrete memory address from the symbolic references included in the run-time constant pool 304 of the class. To resolve the symbolic references, the virtual machine 104 utilizes the class loader 107 to load the class identified in the symbolic reference (if not already loaded). Once loaded, the virtual machine 104 has knowledge of the memory location within the per-class area 303 of the referenced class and its fields/methods. The virtual machine 104 then replaces the symbolic references with a reference to the concrete memory location of the referenced class, field, or method. In an embodiment, the virtual machine 104 caches resolutions to be reused in case the same class/name/descriptor is encountered when the virtual machine 104 processes another class. For example, in some cases, class A and class B may invoke the same method of class C. Thus, when resolution is performed for class A, that result can be cached and reused during resolution of the same symbolic reference in class B to reduce overhead.

In some embodiments, the step of resolving the symbolic references during linking is optional. For example, an embodiment may perform the symbolic resolution in a "lazy" fashion, delaying the step of resolution until a virtual machine instruction that requires the referenced class/method/field is executed.

During initialization, the virtual machine 104 executes the constructor of the class to set the starting state of that class. For example, initialization may initialize the field and method data 306 for the class and generate/initialize any class instances on the heap 302 created by the constructor. For example, the class file 200 for a class may specify that a particular method is a constructor that is used for setting up the starting state. Thus, during initialization, the virtual machine 104 executes the instructions of that constructor.

In some embodiments, the virtual machine 104 performs resolution on field and method references by initially checking whether the field/method is defined in the referenced class. Otherwise, the virtual machine 104 recursively searches through the super-classes of the referenced class for the referenced field/method until the field/method is located, or the top-level superclass is reached, in which case an error is generated.

3. Generating Dynamic Proxy Classes

In one or more embodiments, the runtime environment 113 includes instructions for generating dynamic proxy classes. A proxy class is a class created at runtime that implements a specified list of interfaces, referred to herein as proxy interfaces. A proxy object is an instance of a proxy class. Each proxy object has an associated method call processor object. An example of a method call processor object is an invocation handler object, which implements the interface InvocationHandler as defined within the package java.lang.reflect of the Java framework. A method invocation on a proxy object through one of its proxy interfaces may be dispatched to the invoke method of the instance's invocation handler, passing the proxy object, a java.lang.reflect.Method object identifying the method that was invoked, and an array of type Object containing the arguments. The invocation handler processes the encoded method invocation as appropriate and the result that it returns will be returned as the result of the method invocation on the proxy object.

Figure 4:
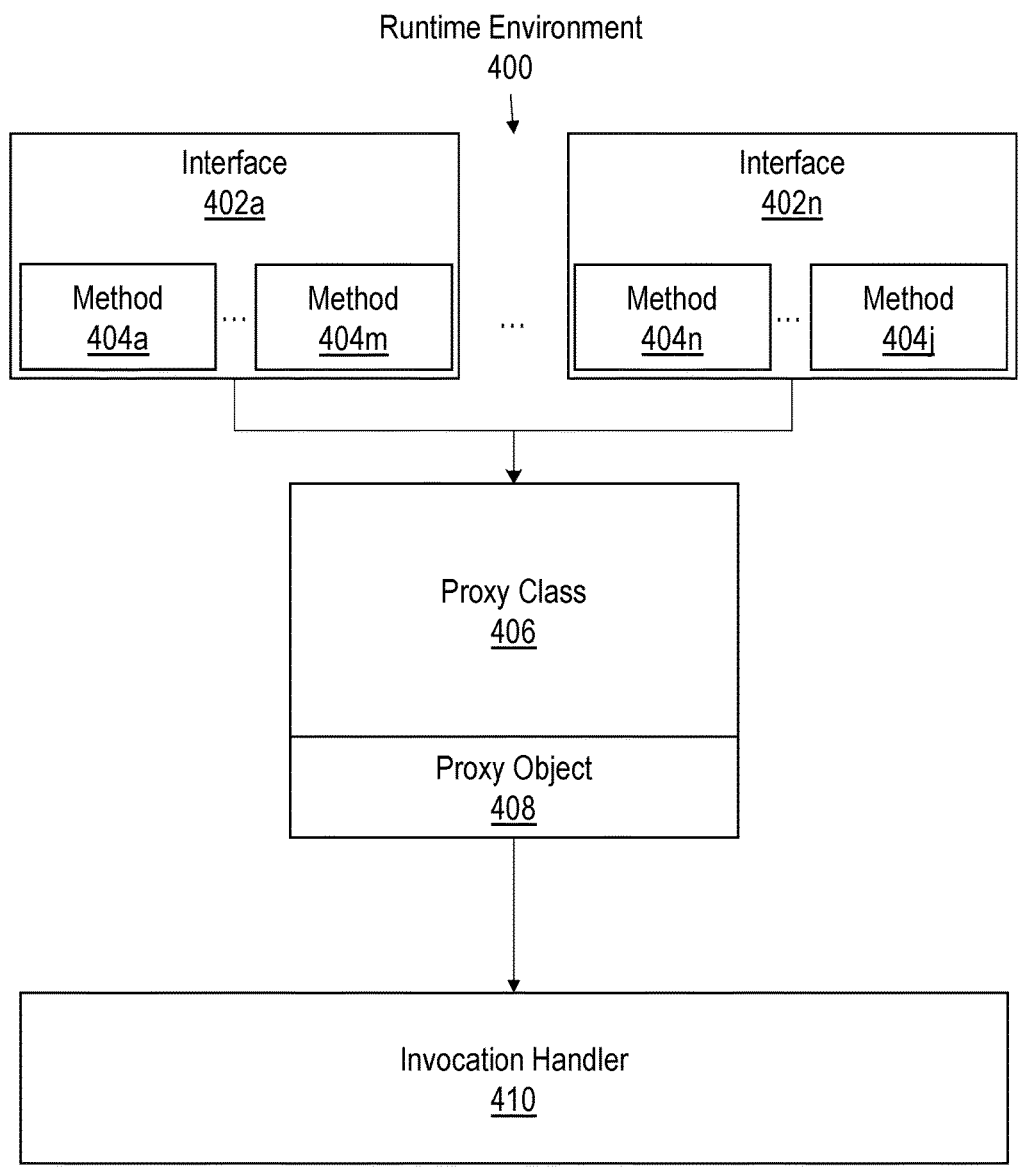
FIG. 4 illustrates an example of a dynamically generated proxy, in accordance with one or more embodiments.

FIG. 4 illustrates a particular state of a runtime environment that has dynamically generated a proxy class, in accordance with one or more embodiments. As illustrated in FIG. 4, a runtime environment 400 includes interfaces 402*a-n*. Each of interfaces 402*a-n* declares one or more methods. For example, interface 402*a* declares methods 404*a-m*, and interface 402*n* declares methods 404*n-z*. An interface may declare default methods and/or abstract methods. As previously mentioned, a default method includes a method signature and a method body. An abstract method includes a method signature but no method body.

In an example, each of the declarations of the interfaces 402*a-n* may include but are not limited to the structural elements as illustrated below with reference to interface A, each interface having any number of respective methods:

```
interface A {
    void a_Method1( );
    ...
    void a_MethodAM( );    //AM is the total number of methods in
    interface A
}
```

The runtime environment 400 further includes a proxy class 406, which implements interfaces 402*a-n*. The proxy class 406 is generated during runtime such that a method invocation of one of methods 404*a-m* and 404*n-z* is dispatched to a single method in an invocation handler 410.

Proxy class 406, which implements each of the interfaces 402*a-n* may include but is not limited to one or more structured elements as illustrated below:

```
class $Proxy$ implements A, B, ..., N {
    // methods of interface A, where AM is the number of methods declared in A
    void a_Method1( ) {...Invoke 'a_Method1' on method call processor...}
    void a_Method2( ) {...Invoke 'a_Method2' on method call processor...}
    ...
    void a_MethodAM( ) {... Invoke 'a_MethodAM' on method call processor...}
    // methods of interface B, where BM is the number of methods declared in B
    void b_Method1( ) {...Invoke 'b_Method1' on method call processor...}
    void b_Method2( ) {...Invoke 'b_Method2' on method call processor...}
    ...
    void b_MethodBM( ) {...Invoke 'b_MethodBM' on method call processor...}
    ...
    // methods of interface N, where NM is the number of methods declared in N
    void n_Method1( ) {...Invoke 'n_Method1' on method call processor...}
```

```
    void n_Method2( ) {...Invoke 'n_Method2' on method call processor...}
...
    void n_methodNM( ) {... Invoke 'n_MethodNM' on method call processor...}
}
```

The proxy object 408 is an instance of the proxy class 406, which may be generated upon request. In one or more embodiments, requesting the proxy object includes invoking a method with arguments (a) an array of the Class objects (representing the interfaces and (b) the method call processor object. The method invocation may further specify a particular class loader as an argument. In an example, the test framework requests a proxy object from the proxy subsystem by invoking the newProxyInstance method of java.lang.reflect.Proxy and passing at least (a) an array of the Class objects representing the interfaces and (b) an object of myInvocationHandler type. In one or more embodiments, the runtime environment 400 uses the proxy object 408 to invoke the methods of the interfaces 402*a-n*. The runtime environment 400 may use reflective operations (e.g., from the Java reflection API) to invoke the methods of the interfaces.

A Class object is an instance of java.lang.Class. Such an object represents not an entity of the real world (such as a person or a vehicle) but rather an entity within the runtime environment, namely a class or an interface. Given a Class object that represents a class, an instance of the class may be created by invoking various methods on the Class object. The runtime environment 400 may receive the Class objects (representing interfaces) as arguments from the user code. The runtime environment 400 may create the Class objects (representing interfaces) directly, via the java.lang.ClassLoader.loadClass method that loads the bytes of .class file from disk and then defines classes to the virtual machine, e.g. via the defineClass method of java.lang.ClassLoader. Alternatively, the runtime environment 400 may create the Class objects (representing interfaces) indirectly, via the java.lang.Class.forName method which returns the Class object associated with the class or interface identified in the arguments of the method.

In one or more embodiments, the invocation handler 410 is a method call processor object. The runtime environment 400 may instantiate a class implementing a method call processor to obtain the invocation handler 410. In an example, the runtime environment 400 instantiates a user-defined class myInvocationHandler which implements an interface InvocationHandler in the Java reflection API.

In one or more embodiments, the invocation handler 410 performs one or more operations before, after, or as an alternative to dispatching a method call to an underlying Class object that implements a method of an interface. For example, the invocation handler 410 may perform one or more operations including, but not limited to, (a) logging statistics about the method call (e.g., the number and/or frequency), (b) performing security checks on the method caller, (c) presenting messages about the method call, and/or (d) invoking a separate method. The invocation handler 410 thus act as a mechanism through which method calls may be intercepted, logged, and rerouted.

In one or more embodiments, a request for a proxy object, such as proxy object 408, includes, as arguments: (a) an array of Class objects representing interfaces and (b) a method call processor object. The request for the proxy object may further include a class loader as an argument. In an example, the following code set (expressed in pseudo-code) may be used to request a proxy object and invoke the methods of interfaces using reflective operations executed on the proxy object:

```
Object o = ...request to make proxy object...
Class c = o.getClass( );              // get proxy class of proxy object
Class[ ] is = c.getInterfaces( );     // array of Class objects representing
                                      interfaces
for (Class i : is) {                  // traverse all interfaces
    Method[ ] ms = i.getMethods( )    // array of methods for the interface
    for (Method m : ms) {             // traverse each method of the
                                      interface
        m.invoke(... arguments ...);  // invoke methods for testing
    }
}
```

Responsive to the request, the runtime environment 400 may generate the proxy class 406 if not already defined. For example, the proxy class 406 may have been previously defined in the class loader if a request for the same permutation of interfaces was previously received. The proxy class 406 (*a*) implements all of the interfaces represented by the Class objects in the request for the proxy object and (b) uses the invocation handler 410 to help to implement the methods of the interfaces. The runtime environment 400 identifies the declarations of the interfaces based on the Class objects that represent the interfaces. The runtime environment 400 generates the proxy class 406 using the declarations of the interfaces and returns the proxy object 408 as an instance of the proxy class 406.

4. Conflict Resolution for Proxying Interface Methods

Conflicts may arise when a class implements different interfaces that declare default methods having the same method signature. For example, if one or more of methods 404*a-m* and 404*n-z* are default methods that share the same method signature, then ambiguity arises as to which interface method should be proxied. When a conflict arises, the runtime environment 400 may implement one or more of the conflict resolution actions described in further detail below.

Conflicts may be detected when two default methods, in different interfaces to be implemented by a class, share the same method signature. A method signature may comprise or consist of a method name, a set of one or more parameter types (e.g., input parameter types), and/or a return type. In some embodiments, methods may be determined to conflict if they share the same name even if they do not share the same parameter types and/or return type. For example, the default method with signature void m(int) may be determined to conflict with int m(double) of another interface as both methods share the same name "m" even though the return types and parameter types are different. In other embodiments, methods with the same name may be determined not to conflict if the parameter types and/or return type differ. Thus, in the preceding example, the methods may be determined not to conflict. However, the default method void m(int) of one interface would conflict with a default method void m(int) of another interface.

When there are conflicting default methods declared in different interfaces implemented by a class, the class declaration may explicitly select one method over another. For example, when no proxying is involved, the following code may be used to select a default method:

```
interface I {
    abstract void a( );
    default void m( ) { System.outprintln("I::m"); }
}
interface J {
    abstract void b( );
    default void m( ) { System.outprintln("J::m"); }
}
class A { }
class B extends A implements I,J {
    void a( ) { System.out.println("I::a"); }
    void b( ) { System.out.println("J::b"); }
    void m( ) { I.super.m( ); }
}
```

In the foregoing, the default method m( ) conflicts between interface I and J. Class B overrides both I and J's default method m( ) by declaring a concrete method m( ) of its own. The body of this concrete method then selects the default method in I with the statement:

I.super.m( );

This statement resolves the ambiguity by selecting the default method m( ) defined by interface I instead of interface J.

Proxying adds a layer of complexity to conflict resolution since a proxy object may be used to intercept method calls, some of which may invoke default methods that conflict. A request for a proxy object implementing interfaces I and J above may trigger generation of a proxy class that overrides all methods in I and J. However, the method call processor object that is associated with the request may not be able to respond in a satisfactory way to an invocation of the method named "m" with no parameter types and a void return type. For example, the method call processor object may embody an invocation handler, as previously described. In some cases, an invocation handler may be unable to select the default method in interface I by means of the statement I.super.m( ). This limitation in an invocation handler may arise because the handler is unable to express the statement in terms of a reflective API. Alternatively, this limitation in an invocation handler may arise because the handler is implemented via translation to classes which are not in a suitable subtype relationship with interfaces I and J (for example, the handler attempts to reflectively invoke I.super.m( ) but the implementation of the handler places the reflective invocation in a class which does not declare I as a superinterface).

In an embodiment, a compiler (or JVM/interpreter or other component) searches for and detects conflicting method signatures for default methods across different interfaces during generation of a class that is instantiated to generate a proxy object. For example, a request to generate a proxy object may be identified. An example request may appear as Ix=Proxy.newProxyInstance(loader, new Class<?>[ ] {I.class, J.class}, new Handler( ));

In response to identifying the request, the process may search for methods that are declared within the interfaces and that share the same method signature. If the process finds methods that share the same method signature, then the process may perform a responsive action. Example responsive actions, described in further detail in the corresponding subsections 4.1 to 4.5 below, may include, but are not limited to:

Triggering a failure to generate the proxy class;

Generating a proxy class that triggers a runtime error when an application invokes a method with the same signature as conflicting default methods;

Generating a proxy class that selects a default method from one of the interfaces implemented by the proxy class; and/or Delegating resolution to a method call processor object.

4.1 Non-Generation of Proxy Class

One responsive action that may be implemented by the runtime environment is to prevent generation of a proxy class for a requested proxy object that implements interfaces with conflicting default methods. For example, the runtime environment may receive a request for a proxy object that implements interfaces I and J, as depicted above. In response to detecting the conflicting default method m( ), the runtime environment may cause generation of the proxy class to fail or otherwise be prevented. Because the proxy class is not generated, a proxy object instantiated from the proxy class cannot be returned to the requesting application, thereby triggering a runtime error.

Failing to generate a proxy class embodies a policy of preventing proxy objects from implementing interfaces with conflicting default methods. This approach encompasses a broad restriction on the interfaces that may be implemented by the same class. If a user request is attempting to proxy interfaces with conflicting default methods, then the request may immediately trigger an error. The requesting user code may detect that the proxy object could not be returned and notify the user. The user may take corrective action by removing invocations to the conflicting method and/or rewriting the underlying code to disambiguate between which default method was intended.

4.2 Proxy Classes that Trigger Errors

Rather than failing to generate a proxy class, a more fine-tuned approach is to generate a proxy class that triggers an error when an application invokes a method with conflicting default implementations. In this case, the runtime environment successfully generates the proxy class for the requested proxy object. Thus, a runtime error is not triggered in response to the request. Instead, the proxy class triggers a runtime error when an application attempts to invoke a method with conflicting default implementations. The invocation may occur much later and/or by separate user code than the user code that requested generation of the proxy object. For example, the invocation and resulting error may occur hours, days, months or even years after the proxy object has been generated.

In an embodiment, the runtime error prevents control from passing to a corresponding method in a method call processor object, such as the invocation handler 410. This approach embodies a policy of fencing off conflicting default methods from other default methods in the interfaces, which may be invoked without triggering an error. User code may detect the conflicting method that triggered the runtime error and take appropriate corrective action, if warranted, such as removing invocations to the conflicting method and/or rewriting the underlying code to disambiguate between which default method was intended.

The runtime environment may generate a proxy class that triggers an error in several ways. Examples, discussed in further detail in subsections 4.2.1 to 4.2.4 below, include, but are not limited to:

Generating a proxy class that omits method declarations for conflicting default methods;

Generating a proxy class that declares an abstract method for conflicting default methods; and/or Generating a proxy class that includes a concrete method declaration with a method body that triggers an error when invoked.

4.2.1 Omitting Method Declarations

In an embodiment, the process that generates the proxy class omits method declarations for conflicting default methods. For instance, in the example above where interface I and interface J have conflicting default methods for m( ), the process may omit a method declaration with signature m( ) from the proxy class definition. The process may generate a proxy class that includes method declarations for all abstract methods and/or default methods in the interfaces for which there is no conflict.

The following code illustrates an example proxy class that implements interface I and interface J but omits a method declaration for conflicting default method m( ):

```
class $Proxy$ implements I, J {
    // methods of interface I with m( ) omitted
    void a( ) {...Invoke 'a' on method call processor...}
    // methods of interface J with m( ) omitted
    void b( ) {... Invoke 'b' on method call processor...}
}
```

A proxy class that is declared to implement more than one interface, but does not declare a method corresponding to conflicting default methods in the interfaces, is not legal in ordinary source code. However, the runtime environment does not check whether a proxy class, generated and loaded at runtime, fully implements all the interfaces that are claimed to be implemented by the proxy class. The effect of generating the proxy class is that the proxy object that is returned to the user does not respond to the invocation of method m( ) in the future.

In a runtime environment, omitting the method declaration causes a runtime error to be thrown when an application tries to call an undeclared method. As previously noted, the invocation may occur much later and/or by separate user code than the user code that requested generation of the proxy object. User code may detect the conflicting method that triggered an undeclared method error and notify the user. The runtime error prevents control from passing from a method in the proxy object to a corresponding method in the invocation handler. As a result, conflicting default methods are fenced off from other methods in the interfaces.

4.2.2 Including Abstract Method Declarations

In an embodiment, an abstract method is declared in a proxy class for each set of conflicting default methods that are declared in the interfaces. In the preceding example where both I and J declare default methods m( ), the process may declare an abstract method with the same name and signature. This abstract method addresses the conflict between I and J's default methods by overriding both default methods. The proxy class may further include concrete method declarations and method bodies for all abstract methods and/or default methods in the interfaces for which there is no conflict.

The following code illustrates an example proxy class that implements interface I and interface J and includes an abstract method declaration for a method with the same signature as conflicting default method m( ):

```
class $Proxy$ implements I, J {
    // abstract declaration for conflicting method m( )
    abstract void m( );
    // methods of interface I with m( ) omitted
    void a( ) {...Invoke 'a' on method call processor...}
    // methods of interface J with m( ) omitted
    void b( ) {... Invoke 'b' on method call processor...}
}
```

In the example proxy class depicted above, user code that invokes I.m( ) on a proxy object of the proxy class may receive an error message to indicate that the invoked method is a conflicting default method. The abstract method declaration causes the runtime environment to trigger an error, which is thrown when an application invokes a method that is subsequently determined to be abstract. User code may detect the conflicting method that triggered the abstract method error and notify the user. Similar to the error triggered via omission, the error fences off conflicting default methods from other default methods in the interfaces. The error message may identify information about the conflict, such as the signature of the conflicting default method that triggered the error.

4.2.3 Defining Errors in Concrete Method Declarations

In an embodiment, a concrete method, including a method body that comprises instructions for generating an error, is added to a proxy class for each conflicting default method. For instance, in the example above where interface I and interface J have conflicting default methods for m( ), the process may add a concrete method declaration with signature m( ) and include a method body that triggers an error. The error may be stored, such as in a log file, and/or presented to an end user or application. The proxy class may further include concrete method declarations and method bodies for all abstract methods and/or default methods in the interfaces for which there is no conflict.

4.2.4 Error Handling by a Method Call Processor

Additionally or alternatively, the responsibility for generating an error may be delegated to the invocation handler. In one or more embodiments, the proxy class passes a flag to a corresponding method of the invocation handler when a conflicting default method is detected. For example, the following code illustrates an example proxy class that implements interface I and interface J and includes a concrete method declaration for m( ) for delegating conflict resolution to the invocation handler:

```
class $Proxy$ implements I, J {
    // concrete declaration for conflicting method m( )
    void m ( ) {...Invoke 'm' on method call processor with flag...}
    // methods of interface I with m( ) omitted
    void a( ) {...Invoke 'a' on method call processor...}
    // methods of interface J with m( ) omitted
    void b( ) {... Invoke 'b' on method call processor...}
}
```

In the example proxy class depicted above, user code that invokes I.m( ) on an instance/proxy object of the proxy class causes the method call processor, such as an invocation handler, to process the encoded method invocation. The method call processor may define error handling logic that effectively overrides the conflicting default methods in interfaces I and J. In other words, the default methods defined by the interfaces implemented by I and J is executed when the method is invoked. In this case, control passes to the invocation handler, but the invocation handler may trigger an error rather than the proxy object. Thus, this approach also fences off conflicting default methods from other default methods in the interfaces.

4.3 Default Method Selection

Another responsive action that may be implemented by the runtime environment is to select a default method from one of the conflicting default methods. For example, if a request is received for a class that implements interfaces I and J, as shown above, then a default method for method m( ) may be selected from either I or J. Once selected, the runtime environment may generate a proxy class that causes the selected default method to be invoked on a method call processor, such as an invocation handler as previously described.

The criteria used to select a default method may vary from implementation to implementation. In an embodiment, the criteria are based on one or more factors that disambiguate which of the default conflicting methods was intended to be invoked. Disambiguation of conflicting default methods may be provided, implicitly or explicitly, by user code that requests a proxy object. For example, a request for a proxy object may include or otherwise be associated with metadata that identifies which method to select. As another example, the selection may be made based on naming conventions, such as the order of interfaces as listed in the request. The invocation Proxy.newProxyInstance(loader, new Class<?>[ ] {I.class, J.class}, . . . ) may select I's default methods when there is a conflict whereas the invocation Proxy.newProxyInstance(loader, new Class<?>[ ] {I.class, J.class}, . . . ) may select J's default methods.

In an embodiment, the selection of a default method may be performed based on a set of pre-defined rules or heuristics. One example of a heuristic is to select the default method that has been invoked the greatest number of times or the most frequently. The runtime environment may track invocations across multiple applications and instances of user code. Based on these metrics, the runtime environment may determine which method is most popular and likely to be invoked. The heuristic may define a policy of selecting the default method based on such metrics with an assumption that the most frequently invoked methods are the ones that were most likely intended by the requesting user code. Other pre-defined heuristics may assign priority to one interface over another, with the higher priority interface overriding the lower priority interface conflicting default methods. Thus, if I has a higher assigned priority than J, then I's default method m( ) may be selected. Conversely, if J has a higher priority, then J's default method m( ) may be selected.

In an embodiment, selection of a default method may be performed after the proxy class has been generated. When user code invokes a method with conflicting default methods, the runtime environment may prompt the user to select one of the default methods defined by the interfaces implemented by the class. The runtime environment may then execute the default method that was explicitly selected via the received user input. If the user is uncertain of which default method to execute, then the user may select an option to exit the current code path.

As previously noted, the runtime environment may generate a proxy class that causes a selected default method to be invoked on a method call processor, such as an invocation handler. The runtime environment may generate the proxy class in several ways. Examples, discussed in further detail in subsections 4.3.1 to 4.3.4 below, include, but are not limited to:

Generating a proxy class which declares a concrete method whose body selects the default method from one of the interfaces implemented by the proxy class;

Generating a separate interface which selects the default method to use from multiple interfaces with conflicting default methods; and/or Generating a proxy class which declares a concrete method whose body prompts a user to select the default method from one of the interfaces implemented by the proxy class;

4.3.1 Adding Concrete Methods

In an embodiment, the process that generates the proxy class is configured to add a concrete method whose body selects the default method from one of the interfaces implemented by the proxy class. For example, if J's default method m( ) is selected according to one of the approaches previously described, then the following code may be generated for the proxy class:

```
class $Proxy$ implements I, J {
    // select default method m( ) from interface J
    void m( ){ J.super.m ( ); }
    // methods of interface I with m( ) omitted
    void a( ) {...Invoke 'a' on method call processor...}
    // methods of interface J with m( ) omitted
    void b( ) {...Invoke 'b' on method call processor...}
}
```

In the preceding example, the body of the proxy class' m method would cause the invocation J.super.m( ), as if written in ordinary source code. In the event that I's default method is selected, then I.super.m( ) may replace I.super.m( ) in the method body.

4.3.2 Generating Synthetic Interfaces

Another technique for selecting a default method is through a synthetic interface. A synthetic interface is an interface generated at runtime. In the present case, the synthetic interface may be generated to extend the interfaces implemented by the proxy class. The synthetic interface may act as a superinterface that declares the default method, which may be selected based on the factors previously described. For instance, if I's default method m( ) is selected, then a new superinterface may be generated as follows:

```
interface $ProxyIJ$ extends I,J {
    @Override default void m( ) { I.super.m( ); }
}
```

When a proxy class is generated, the proxy class may implement $ProxyIJ$. As $ProxyIJ$ is a superinterface, the default method m( ) overrides the default methods in I and J. However, the code I.super.m( ) selects I's default method m( ) rather than J's default method m( ). In other cases, $ProxyIJ$ may replace this code with J.super.m( ) to select J's default method m( ). The synthetic interface that is generated may be reused via multiple inheritance for a wide range of proxy object requests. However, synthetic interfaces may consume more memory than the concrete memory approach described in the preceding section. Therefore, selecting a default method via concrete method declarations may be preferable in environments where memory is constrained.

4.3.3 Prompting Users to Select Default Methods

Another technique for selecting a default method is to add a concrete method to the proxy class that prompts the user to make the selection. For example, a concrete method declaration void m( ) may be added to the proxy class. In the method body, a prompt to select the user input may be defined. If the user selects I's default method m( ), then the method body may invoke I.super.m( ). On the other hand, if the user selects Is default method m( ), then the method body may invoke J.super.m( ).

4.3.4 Passing Control to a Method Call Processor

As previously mentioned, error handling may be delegated to a method call processor, such as invocation handler 410. Additionally or alternatively, the responsibility for selecting a default method may be delegated to the method call processor. For example, the proxy class may pass a flag to a corresponding method of the invocation handler if a conflict is detected. Responsive to receiving the flag, the method of the invocation handler may select the default method based on one or more the selection criteria previously mentioned.

4.4 Example Operations for Addressing Conflicting Default Methods

Figure 5:
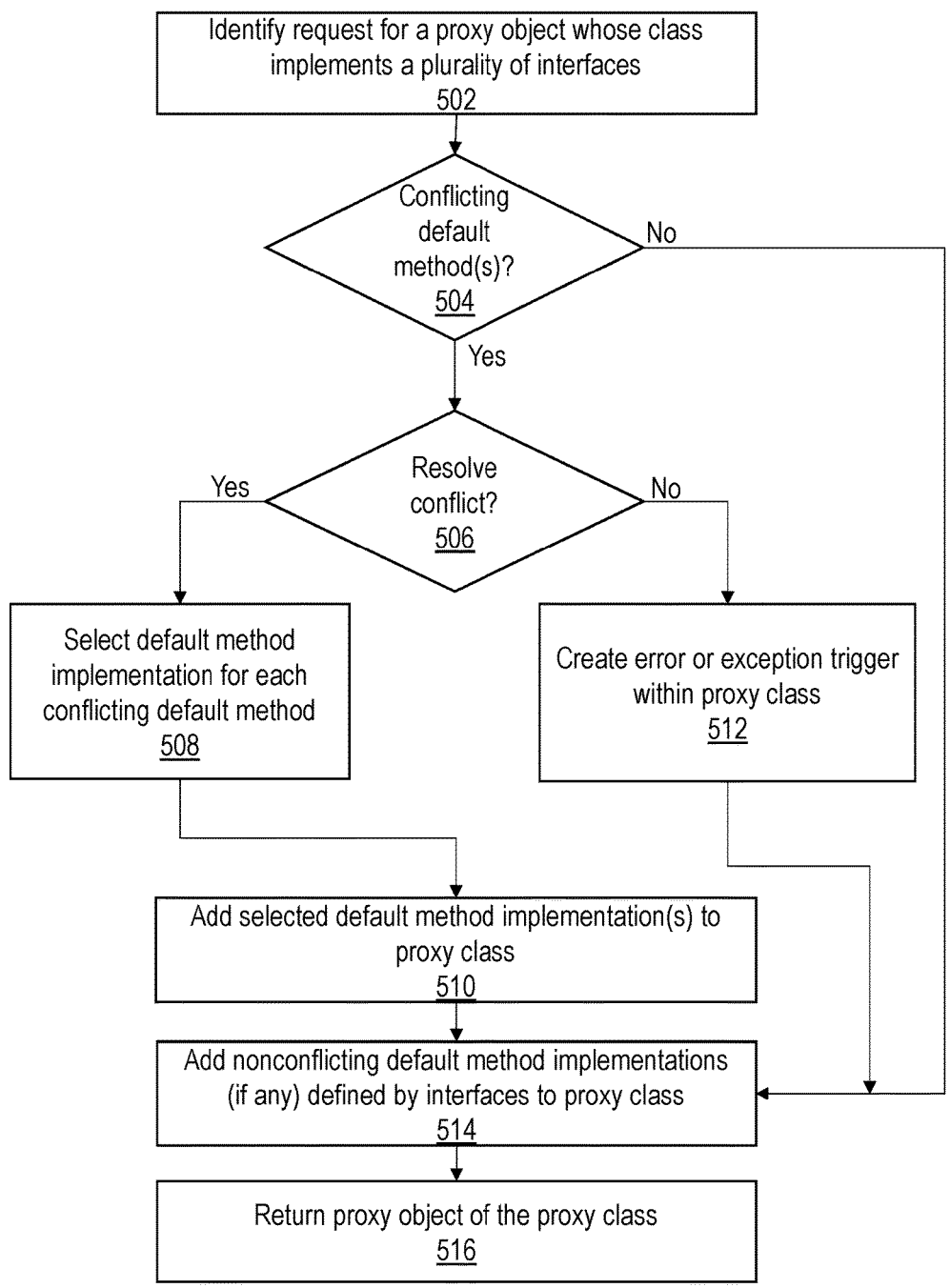
FIG. 5 illustrates a set of operations for identifying and responding to conflicting methods in accordance with one or more embodiments.

FIG. 5 illustrates operations for identifying and responding to conflicting default methods in accordance with one or more embodiments. The operations may be performed by one or more processes of a runtime environment, such as by a JVM. The set of operations includes identifying a request for a proxy object whose class implements a plurality of interfaces (Operation 502). For example, the request may correspond to an invocation of a proxy method, such as Ix=Proxy.newProxyInstance(loader, new Class<?>[ ] {I.class, J.class}, new Handler( ));

Responsive to receiving the request, the runtime environment determines whether there are any conflicting default methods among the plurality of interfaces (Operation 504). In an embodiment, the runtime environment compares method signatures of the default methods belonging to each interface. As previously noted, the method signature may include or consist of a method name, a set of one or more parameters types (e.g., input parameter types), and/or a return type. If the method signatures of two or more different default methods belonging to different interfaces match, then a conflict is detected. Otherwise, if each method signature is unique, then no conflict is detected.

If conflicting default methods are detected, then the runtime environment determines whether to resolve the conflict (Operation 506). In some cases, the runtime environment may be configured to always select a default method to resolve the conflict. In other cases, the runtime environment may be configured to never resolve the conflict, to embody a policy of fencing off conflicting default methods from the other default methods declared by an interface. In other cases, the runtime environment may be configured to resolve the conflict in some situations but not in others. For example, the runtime environment may be configured to resolve the conflict based on pre-defined heuristics or rules that specify when conflicts should be resolved. The pre-defined heuristics or rules may embody a policy that a default method is selected when there is little or no ambiguity about which default method was intended and should not be selected when ambiguity exists.

To resolve a conflict, the runtime environment selects a default method for each set of conflicting default methods (Operation 508). As previously noted, the selection may be based on pre-defined heuristics, request metadata, and/or other selection factors. For example, the default method may be selected based on the order in which the interfaces are listed in the request, with the interfaces appearing first in the list receiving priority over interfaces listed later, or vice versa. Thus, the invocation Proxy.newProxyInstance(loader, new Class<?>[ ] {I.class, J.class}, . . . ) may select I's default methods when there is a conflict whereas the invocation Proxy.newProxyInstance (loader, new Class<?>[ ] {I.class, J.class}, . . . ) may select J's default methods. Other pre-defined heuristics may assign priority to one interface over another, with the higher priority interface overriding the lower priority interface conflicting default methods. Thus, the selection factors may vary from implementation to implementation.

The runtime environment next adds a reference to the selected default method to the proxy class (Operation 510). For example, if I's implementation of m( ) is selected, then method body of m( ), as defined by interface I, may be declared or otherwise referenced in the proxy class. On the other hand, if J's implementation of m( ) is selected, then the method body of m( ), as defined by interface J, is declared or otherwise referenced in the proxy class. In other cases, the selection may be delegated to the invocation handler, as previously mentioned.

In the event that a default method is not selected, then runtime environment creates an error trigger within the proxy class (Operation 512). For example, the runtime environment may add an abstract method declaration or omit a method declaration to trigger an error when user code attempts to invoke the default method. In other cases, the proxy class may invoke a corresponding method from the invocation handler with a flag to indicate that a conflict was detected. Upon detecting the flag, the invocation handler may trigger a runtime error. During this operation, an error message may be generated to serve as a notification that the invoked method has multiple defaults in the implemented interfaces.

The set of operations further comprises adding non-conflicting default methods, if any, defined by the interfaces to the proxy classes (Operation 514). For example, declarations for the default method void a( ) of interface I and the default method void b( ) of interface J may be added to a proxy class implementing I and J as indicated above. The number of default methods that are added may vary depending on the interfaces being implemented by the proxy class.

Once the proxy class has been generated, a proxy object of the proxy class is returned (Operation 516). As previously described, the proxy object has an associated method call processor object, such as an invocation handler object. A method invocation of a default method on a proxy object through one of its proxy interfaces is dispatched to the invoke method of the instance's invocation handler, passing the proxy object, a java.lang.reflect.Method object identifying the method that was invoked, and an array of type Object containing the arguments. The invocation handler processes the encoded default method invocation as appropriate and the result that it returns will be returned as the result of the method invocation on the proxy object.

5. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
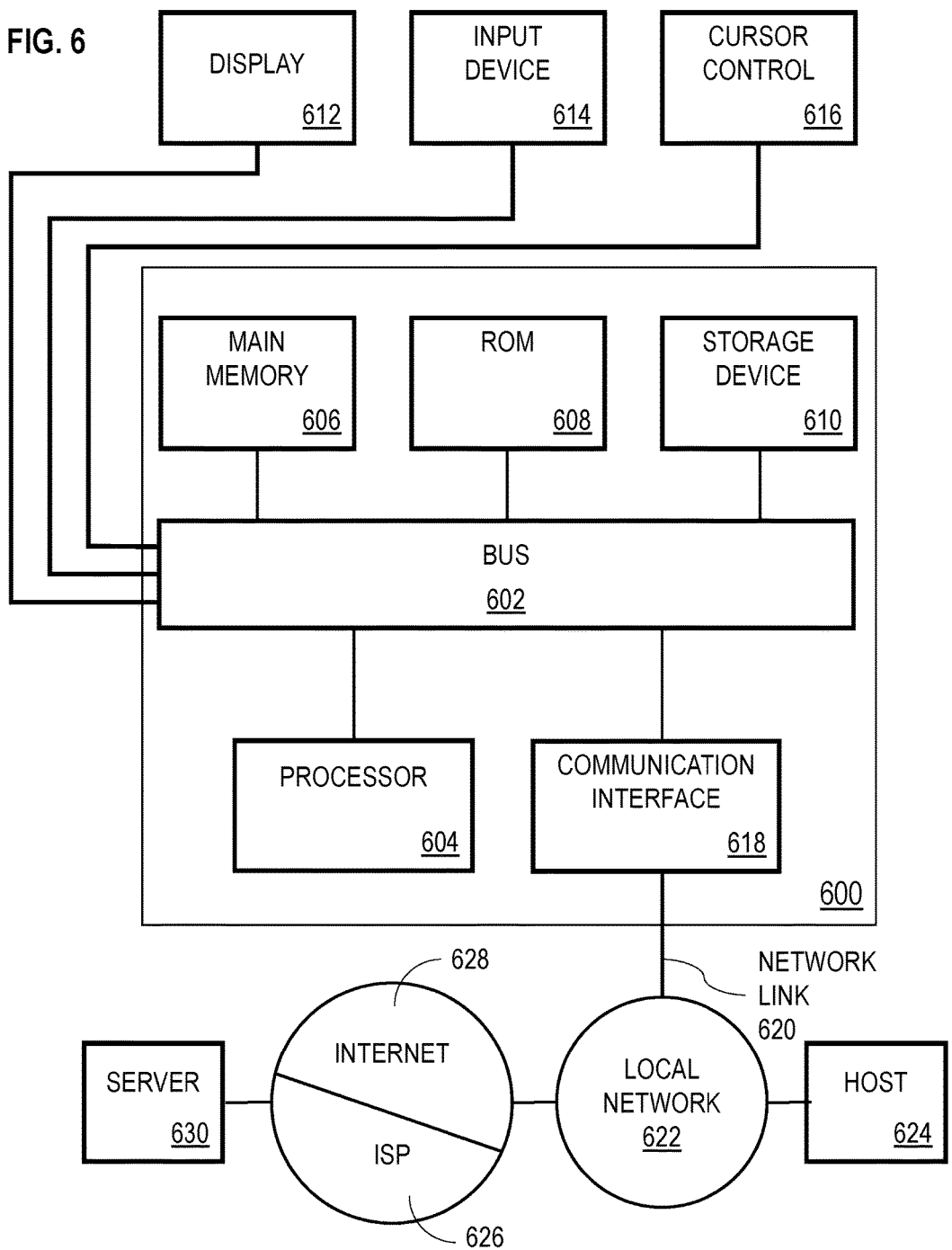
FIG. 6 illustrates a system in accordance with one or more embodiments.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another kind of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding kind of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

6. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer-readable medium comprising instructions which, when executed by one or more hardware processors, causes performance of operations comprising:
   detecting a request for a proxy object, the request identifying a plurality of interfaces;
   generating a class for the proxy object that implements the plurality of interfaces;
   wherein generating the class comprises:
      determining that two or more interfaces, of the plurality of interfaces, define a respective method body with a same method signature;
      responsive to determining that the two or more interfaces define a respective method body with a same method signature, including a method declaration, in the class, for a particular method corresponding to the method signature; wherein the method body of the particular method includes operations to select a default method declared in one interface of the two or more interfaces based on at least one of a frequency with which each default method with the same method signature is invoked, user code included in the request for the proxy object, or an order in which two or more interfaces are listed in the request for the proxy object.

2. The non-transitory computer-readable medium of claim 1, wherein the operations to select the default method are based on the frequency with which each default method with the same method signature is invoked.

3. The non-transitory computer-readable medium of claim 1, wherein the operations to select the default method are based on the user code in the request for the proxy object.

4. The non-transitory computer-readable medium of claim 1, wherein the operations to select the default method include operations for generating a third interface that selects a default implementation for the particular method from one interface of the two or more interfaces.

5. The non-transitory computer-readable medium of claim 1, wherein the operations to select the default method include operations for generating a third interface that selects a default implementation for the particular method from one interface of the two or more interfaces.

6. A non-transitory computer-readable medium comprising instructions which, when executed by one or more hardware processors, causes performance of operations comprising:
   detecting, from application code executing in a runtime environment, a request for a proxy object, the request identifying a plurality of interfaces;
   determining that two or more interfaces, of the plurality of interfaces, define a respective method body with a same method signature;
   responsive to determining that the two or more interfaces define a respective method body with a same method signature, returning, to the application code executing in the runtime environment, one of a proxy object that triggers an immediate runtime error or a valid proxy object that triggers a delayed runtime error when a particular method corresponding to the method signature is invoked using reflective operations executed on the proxy object.

7. The non-transitory computer-readable medium of claim 6, wherein the instructions further cause performance of operations comprising responsive to determining that the two or more interfaces define a respective method body with a same method signature, omitting a method declaration, in a proxy class that is instantiated to generated the proxy object, for the particular method corresponding to the method signature.

8. The non-transitory computer-readable medium of claim 6, wherein the instructions further cause performance of operations comprising responsive to determining that the two or more interfaces define a respective method body with a same method signature, including an abstract method declaration, in a proxy class that is instantiated to generate the proxy object, for the particular method corresponding to the method signature.

9. The non-transitory computer-readable medium of claim 6, wherein the immediate or delayed runtime error includes a notification identifying the method signature.

10. The non-transitory computer-readable medium of claim 6, wherein the instructions further cause performance of operations comprising responsive to determining that the two or more interfaces define a respective method body with a same method signature, including a concrete method declaration and a method body, in a proxy class that is instantiated to generate the proxy object, for the particular method corresponding to the method signature; wherein the method body triggers the delayed runtime error when invoked on the proxy object.

11. The non-transitory computer-readable medium of claim 6, wherein the instructions further cause performance of operations comprising responsive to determining that the two or more interfaces define a respective method body with a same method signature, triggering error handling logic by a method call processor.

12. The non-transitory computer-readable medium of claim 1, wherein the operations to select the default method are based on the order in which two or more interfaces are listed in the request for the proxy object, wherein the default method is selected for the interface that is listed first.

13. A method comprising:
    detecting a request for a proxy object, the request identifying a plurality of interfaces;

generating a class for the proxy object that implements the plurality of interfaces;
wherein generating the class comprises:
  determining that two or more interfaces, of the plurality of interfaces, define a respective method body with a same method signature;
  responsive to determining that the two or more interfaces define a respective method body with a same method signature, including a method declaration, in the class, for a particular method corresponding to the method signature; wherein the method body of the particular method includes operations to select a default method declared in one interface of the two or more interfaces based on at least one of a frequency with which each default method with the same method signature is invoked, user code included in the request for the proxy object, or an order in which two or more interfaces are listed in the request for the proxy object.

14. The method of claim 13, wherein the operations to select the default method are based on the frequency with which each default method with the same method signature is invoked.

15. The method of claim 13, wherein the operations to select the default method are based on the user code in the request for the proxy object.

16. The method of claim 13, wherein the operations to select the default method include operations for generating a third interface that selects a default implementation for the particular method from one interface of the two or more interfaces.

17. The method of claim 13, wherein the operations to select the default method include operations for generating a third interface that selects a default implementation for the particular method from one interface of the two or more interfaces.

18. The method of claim 1, wherein the operations to select the default method are based on the order in which two or more interfaces are listed in the request for the proxy object, wherein the default method is selected for the interface that is listed first.

19. A method comprising:
  detecting, from application code executing in a runtime environment, a request for a proxy object, the request identifying a plurality of interfaces;
  determining that two or more interfaces, of the plurality of interfaces, define a respective method body with a same method signature;
  responsive to determining that the two or more interfaces define a respective method body with a same method signature, returning, to the application code executing in the runtime environment, one of a proxy object that triggers an immediate runtime error or a valid proxy object that triggers a delayed runtime error when a particular method corresponding to the method signature is invoked using reflective operations executed on the proxy object.

20. The method of claim 19, further comprising responsive to determining that the two or more interfaces define a respective method body with a same method signature, omitting a method declaration, in a proxy class that is instantiated to generate the proxy object, for the particular method corresponding to the method signature.

21. The method of claim 19, further comprising responsive to determining that the two or more interfaces define a respective method body with a same method signature, including an abstract method declaration, in a proxy class that is instantiated to generate the proxy object, for the particular method corresponding to the method signature.

22. The method of claim 19, wherein the immediate or delayed runtime error includes a notification identifying the method signature.

23. The method of claim 19, further comprising responsive to determining that the two or more interfaces define a respective method body with a same method signature, including a concrete method declaration and a method body, in a proxy class that is instantiated to generate the proxy object, for the particular method corresponding to the method signature; wherein the method body triggers the delayed runtime error when invoked on the proxy object.

24. The method of claim 19, further comprising responsive to determining that the two or more interfaces define a respective method body with a same method signature, triggering error handling logic by a method call processor.

* * * * *

UNITED STATES PATENT AND TRADEMARK OFFICE
CERTIFICATE OF CORRECTION

PATENT NO. : 10,521,200 B2
APPLICATION NO. : 15/808784
DATED : December 31, 2019
INVENTOR(S) : Buckley et al.

It is certified that error appears in the above-identified patent and that said Letters Patent is hereby corrected as shown below:

On the Title Page

Under Abstract, delete "24 claims" and insert -- 22 claims --.

On page 2, Column 2, under Other Publications, Line 8, delete "Availabe" and insert -- Available --, therefor.

In the Specification

In Column 19, Line 31, delete "{I.class," and insert -- {J.class, --, therefor.

In Column 19, Line 31, delete "J.class}," and insert -- I.class}, --, therefor.

In Column 20, Line 32, delete "I.super.m( )" and insert -- J.super.m( ) --, therefor.

In Column 21, Line 6, delete "Is" and insert -- J's --, therefor.

In Column 22, Line 8, delete "{I.class," and insert -- {J.class, --, therefor.

In Column 22, Line 8, delete "J.class}," and insert -- I.class}, --, therefor.

In the Claims

In Column 26, Line 30, in Claim 7, delete "generated" and insert -- generate --, therefor.

In Column 26, Lines 1-5, Claim 5, below "interfaces" delete "5. The non-transitory computer-readable medium of claim 1, wherein the operations to select the default method include operations for generating a third interface that selects a default implementation for the particular method from one interface of the two or more interfaces.".

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*

In Column 27, Lines 34-38, Claim 17, below "interfaces" delete "17. The method of claim 13, wherein the operations to select the default method include operations for generating a third interface that selects a default implementation for the particular method from one interface of the two or more interfaces.".